(12) United States Patent
Radia et al.

(10) Patent No.: US 12,174,816 B2
(45) Date of Patent: Dec. 24, 2024

(54) METHOD AND SYSTEM FOR UTILIZING A DE-NORMALIZED MASTER TABLE STRUCTURE FOR THE PROCESSING OF SUBSCRIPTIONS

(71) Applicant: JPMorgan Chase Bank, N.A., New York, NY (US)

(72) Inventors: Rohan S Radia, Middlesex (GB); Simon Bench, Bournemouth (GB); James Mark Isger, Dorset (GB); Sowmya Prabhakar, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/131,563

(22) Filed: Apr. 6, 2023

(65) Prior Publication Data

US 2024/0281427 A1    Aug. 22, 2024

(30) Foreign Application Priority Data

Feb. 22, 2023    (IN) .............................. 202311012012

(51) Int. Cl.
| | | |
|---|---|---|
| G06F 16/30 | (2019.01) | |
| G06F 16/22 | (2019.01) | |
| G06F 16/23 | (2019.01) | |
| G06F 16/2455 | (2019.01) | |
| H04L 51/224 | (2022.01) | |

(52) U.S. Cl.
CPC ...... *G06F 16/2282* (2019.01); *G06F 16/2308* (2019.01); *G06F 16/24553* (2019.01); *H04L 51/224* (2022.05)

(58) Field of Classification Search
None
See application file for complete search history.

(56) References Cited

U.S. PATENT DOCUMENTS

| | | | | |
|---|---|---|---|---|
| 6,826,560 | B1 * | 11/2004 | Leymann | G06F 16/284 |
| 6,845,378 | B1 * | 1/2005 | Pauly | G06F 16/25 |
| 7,640,263 | B2 * | 12/2009 | Sundararajan | G06Q 10/107 |
| | | | | 709/224 |
| 8,667,024 | B2 * | 3/2014 | Anand | G06F 16/27 |
| | | | | 707/792 |
| 8,914,404 | B1 * | 12/2014 | Kim | G06F 16/2358 |
| | | | | 707/769 |
| 9,734,466 | B2 * | 8/2017 | Cvetkovic | H04L 41/08 |
| 11,838,300 | B1 * | 12/2023 | Vashisht | G06N 20/00 |
| 11,962,663 | B1 * | 4/2024 | Threlkeld | G06F 16/24568 |
| 2003/0212818 | A1 * | 11/2003 | Klein | H04L 69/329 |
| | | | | 709/219 |
| 2007/0150480 | A1 * | 6/2007 | Hwang | G06Q 50/60 |

(Continued)

*Primary Examiner* — Polina G Peach
(74) *Attorney, Agent, or Firm* — Greenblum & Bernstein, P.L.C.

(57) ABSTRACT

A method for utilizing a master table is provided. The method includes: receiving a subscription table that includes at least one subscription record of at least one subscription that, upon satisfaction of at least one condition of the subscription(s), provides, to a subscriber, a notification of the at least one condition; generating the master table; and generating a mapping table that maps fields of the subscription table to fields of the master table. The master table consolidates each subscription record and stores, as a string value, each of the at least one condition.

20 Claims, 5 Drawing Sheets

(56) References Cited

U.S. PATENT DOCUMENTS

| | | | |
|---|---|---|---|
| 2008/0189362 A1* | 8/2008 | Shi | G06F 16/9535 707/E17.109 |
| 2008/0209441 A1* | 8/2008 | Septon | G06Q 30/02 719/318 |
| 2008/0222210 A1* | 9/2008 | Hodges | G06F 16/958 |
| 2009/0089380 A1* | 4/2009 | Wang | G06Q 10/06 709/206 |
| 2010/0281150 A1* | 11/2010 | Sailhan | H04L 41/0631 709/238 |
| 2012/0011077 A1* | 1/2012 | Bhagat | G06Q 10/0635 705/317 |
| 2012/0221723 A1* | 8/2012 | Cutler | H04M 15/66 709/225 |
| 2012/0284331 A1* | 11/2012 | Kambatla | G06Q 10/06 709/204 |
| 2014/0280317 A1* | 9/2014 | Sahni | G06F 16/958 707/769 |
| 2014/0324503 A1* | 10/2014 | Whittaker | G06Q 50/01 704/9 |
| 2014/0365523 A1* | 12/2014 | Wagner | G06F 16/951 707/770 |
| 2015/0363244 A1* | 12/2015 | Bott | H04W 4/18 719/328 |
| 2016/0065417 A1* | 3/2016 | Sapuram | H04L 41/50 709/223 |
| 2016/0286378 A1* | 9/2016 | Salmela | H04L 63/06 |
| 2017/0034023 A1* | 2/2017 | Nickolov | H04L 43/0817 |
| 2017/0163752 A1* | 6/2017 | Kaledhonkar | H04L 67/306 |
| 2018/0131781 A1* | 5/2018 | Vangala | H04W 52/0258 |
| 2018/0167475 A1* | 6/2018 | Agarwal | H04L 63/101 |
| 2018/0324091 A1* | 11/2018 | Dong | H04L 45/56 |
| 2019/0069123 A1* | 2/2019 | Vincent | H04W 4/70 |
| 2019/0097961 A1* | 3/2019 | Kvalnes | G06Q 10/101 |
| 2019/0147553 A1* | 5/2019 | Reber | G06Q 20/389 705/65 |
| 2020/0028701 A1* | 1/2020 | Liu | H04W 68/005 |
| 2020/0320095 A1* | 10/2020 | Haase | G06F 16/2379 |
| 2021/0182423 A1* | 6/2021 | Padmanabhan | H04L 9/3271 |
| 2021/0357371 A1* | 11/2021 | Devaraj | G06F 16/2379 |
| 2022/0070068 A1* | 3/2022 | Earhart | H04L 43/50 |
| 2022/0070071 A1* | 3/2022 | Poe | H04L 41/14 |

\* cited by examiner

METHOD AND SYSTEM FOR UTILIZING A DE-NORMALIZED MASTER TABLE STRUCTURE FOR THE PROCESSING OF SUBSCRIPTIONS

CROSS-REFERENCE TO RELATED APPLICATIONS

This application claims priority benefit from Indian Application No. 202311012012, filed Feb. 22, 2023, which is hereby incorporated by reference in its entirety.

BACKGROUND

1. Field of the Disclosure

The field of the invention disclosed herein generally relates to methods and systems for utilizing a de-normalized master table and, more particularly, to methods and systems for utilizing a de-normalized master table structure to improve the processing of subscriptions for updates to at least one database.

2. Background Information

A business requirement may allow users to subscribe and receive a notification in real-time, when a database record is created or updated, based on a set of conditions. This business requirement may be part of a migration to a new cloud-based platform and may be part of a decommissioning of several legacy platforms, such as HP Service Manager (HPSM). However, conventional cloud-based platforms have a Notification Subscription Engine that is inefficient and, based on the expected volume of database records and users, cannot process subscriptions in a timely manner.

Once trigger conditions are selected, an additional set of conditions may determine whether a notification is to be sent out. These conditions are critical values on a subscription record and enable users to receive relevant notifications. Once a subscription is created, existing solutions translate the trigger conditions and additional conditions into a glide SQL query, and the glide SQL query is stored as a value within the subscription record.

Therefore, every time a database record is created or updated, the Notification Subscription Engine triggers, which sequentially queries each subscription against the underlying database record. Where there are subscriptions matching all conditions, the query comes back as True and a notification is sent out to the users.

Accordingly, if there are approximately 500,000 subscriptions and 20,000 database records created or updated per day, this will amount to 10 billion queries per day. Hence, based on an average query time of 10 ms, this will add up to 1,150 days of processing time per day on the platform, which is unsustainable.

As a result, there is a need for an improvement to query efficiency in processing subscriptions for the creation and update of database records in a database.

SUMMARY

The present disclosure, through one or more of its various aspects, embodiments, and/or specific features or sub-components, provides, inter alia, various systems, servers, devices, methods, media, programs, and platforms for utilizing a master table to improve a query efficiency in processing subscriptions upon a creation and update of database records in a database.

According to an aspect of the present disclosure, a method is provided for utilizing a master table. The method may comprise: receiving a subscription table that includes at least one subscription record of at least one subscription that, upon satisfaction of at least one condition of the at least one subscription, provides, to a subscriber, a notification of the at least one condition; generating the master table; and generating a mapping table that maps fields of the subscription table to fields of the master table. The master table may consolidate each of the at least one subscription record and may store, as a string value, each of the at least one condition.

In the method, an update to the subscription table may automatically initiate a corresponding update to the master table and the mapping table, and the corresponding update comprises the update.

The method may further comprise: receiving an indication of an update to the subscription table; and updating the master table to include a new subscription record by utilizing the mapping table to map, to at least one of the fields of the master table, each of at least one new parameter that corresponds to the new subscription. In the method, the update may include the new subscription record that relates to a new subscription. In the method, when a particular condition of at least one new condition that corresponds to the new subscription does not specify one of the at least one new parameter, the updating may comprise utilizing the mapping table to map the particular condition to an empty field of the master table. In the method, for each alternative parameter that is specified as being one of alternative parameters of a first new condition of the at least one new condition, the master table may be populated with separate subscription records that each correspond to each of the one of alternative parameters of the first new condition. In the method, each of the separate subscription records may include a corresponding condition for each of the at least one new condition that corresponds to the new subscription.

In the method, the each of the at least one condition may be represented, in the master table, as one from among a distinct column and a distinct row.

The method may further comprise: receiving an indication of an update to a first database record in a database; generating a first query for parameters of the first database record; utilizing the first query to search the master table for at least one matching subscription that has subscription parameters that each match at least one of the parameters of the first database record; and for each of the at least one matching subscription, notifying, respective subscribers to each of the at least one matching subscription, of the update to the first database record. In the method, upon determining that a particular parameter has not been specified for a corresponding condition of the matching subscription, an unspecified parameter of the corresponding condition may always be deemed to match a corresponding parameter that is specified for the corresponding condition in the first database record.

In the method, the first query may comprise an expression that is equivalent to a Boolean expression that requires each of the parameters of the first database record and that searches the master table for each of the at least one matching subscription record.

The method may further comprise: determining whether to notify the respective subscribers of the update to the database record via at least one from among an e-mail message and a short messaging service (SMS) message; and upon determining that a particular subscriber from among the respective subscribers has elected to be notified in real time, determining that the notification is to be provided to the particular subscriber via the SMS message.

The method may further comprise compiling a list that comprises both the respective subscribers and other relevant entities that are directly impacted by the update to the first database record. In the method, the other relevant entities may be determined by at least one from among an artificial intelligence and a machine learning model.

In the method, the database that stores the first database record may be managed by a software-as-a-service (SaaS) cloud computing platform.

In the method, the SaaS cloud computing platform may be ServiceNow.

According to another aspect of the present disclosure, a system is provided for utilizing a master table. The system may comprise: a processor; and a memory that stores instructions that, when executed by the processor, cause the processor to perform various operations. The processor may be configured to: receive a subscription table that includes at least one subscription record of at least one subscription that, upon satisfaction of at least one condition of the at least one subscription, provides, to a subscriber, a notification of the at least one condition; generate the master table, wherein the master table consolidates each of the at least one subscription record and stores, as a string value, each of the at least one condition; and generate a mapping table that maps fields of the subscription table to fields of the master table.

In the system, an update to the subscription table may automatically initiate a corresponding update to the master table and the mapping table, and the corresponding update comprises the update.

The processor may be further configured to: receive an indication of an update to the subscription table; and update the master table to include a new subscription record by utilizing the mapping table to map, to at least one of the fields of the master table, each of at least one new parameter that corresponds to the new subscription. In the system, the updating may include the new subscription record that relates to a new subscription. In the system, when a particular condition of at least one new condition that corresponds to the new subscription does not specify one of the at least one new parameter, the updating may comprise utilize the mapping table to map the particular condition to an empty field of the master table. In the system, for each alternative parameter that is specified as being one of alternative parameters of a first new condition of the at least one new condition, the master table may be populated with separate subscription records that each correspond to each of the one of alternative parameters of the first new condition. In the system, each of the separate subscription records may include a corresponding condition for each of the at least one new condition that corresponds to the new subscription.

In the system, the each of the at least one condition may be represented, in the master table, as one from among a distinct column and a distinct row.

The processor may be further configured to: receive an indication of an update to a first database record in a database; generate a first query for parameters of the first database record; utilize the first query to search the master table for at least one matching subscription that has subscription parameters that each match at least one of the parameters of the first database record; and for each of the at least one matching subscription, notify, respective subscribers to each of the at least one matching subscription, of the update to the first database record. In the system, upon determining that a particular parameter has not been specified for a corresponding condition of the matching subscription, an unspecified parameter of the corresponding condition may always be deemed to match a corresponding parameter that is specified for the corresponding condition in the first database record.

In the system, the first query may comprise an expression that is equivalent to a Boolean expression that requires each of the parameters of the first database record and that searches the master table for each of the at least one matching subscription record.

The processor may be further configured to: determine whether to notify the respective subscribers of the update to the database record via at least one from among an e-mail message and a short messaging service (SMS) message; and upon determining that a particular subscriber from among the respective subscribers has elected to be notified in real time, determine that the notification is to be provided to the particular subscriber via the SMS message.

The processor may be further configured to compile a list that comprises both the respective subscribers and other relevant entities that are directly impacted by the update to the first database record. In the system, the other relevant entities may be determined by at least one from among an artificial intelligence and a machine learning model.

In the system, the database that stores the first database record may be managed by a software-as-a-service (SaaS) cloud computing platform.

According to yet another aspect of the present disclosure, a non-transitory computer-readable medium is provided for utilizing a master table. The computer-readable medium stores instructions that, when executed by a processor, cause the processor to perform various operations. The processor may be configured to: receive a subscription table that includes at least one subscription record of at least one subscription that, upon satisfaction of at least one condition of the at least one subscription, provides, to a subscriber, a notification of the at least one condition; generate the master table, wherein the master table consolidates each of the at least one subscription record and stores, as a string value, each of the at least one condition; and generate a mapping table that maps fields of the subscription table to fields of the master table.

An update to the subscription table may automatically initiate a corresponding update to the master table and the mapping table, and the corresponding update comprises the update.

When executed by the processor, the instructions may further cause the processor to: receive an indication of an update to the subscription table; and update the master table to include a new subscription record by utilizing the mapping table to map, to at least one of the fields of the master table, each of at least one new parameter that corresponds to the new subscription. The updating may include the new subscription record that relates to a new subscription. When a particular condition of at least one new condition that corresponds to the new subscription does not specify one of the at least one new parameter, the updating may comprise utilize the mapping table to map the particular condition to an empty field of the master table. For each alternative parameter that is specified as being one of alternative parameters of a first new condition of the at least one new condition, the master table may be populated with separate subscription records that each correspond to each of the one of alternative parameters of the first new condition. Each of the separate subscription records may include a corresponding condition for each of the at least one new condition that corresponds to the new subscription.

Each of the at least one condition may be represented, in the master table, as one from among a distinct column and a distinct row.

When executed by the processor, the instructions may further cause the processor to: receive an indication of an update to a first database record in a database; generate a first query for parameters of the first database record; utilize the first query to search the master table for at least one matching subscription that has subscription parameters that each match at least one of the parameters of the first database record; and for each of the at least one matching subscription, notify, respective subscribers to each of the at least one matching subscription, of the update to the first database record. Upon determining that a particular parameter has not been specified for a corresponding condition of the matching subscription, an unspecified parameter of the corresponding condition may always be deemed to match a corresponding parameter that is specified for the corresponding condition in the first database record.

The first query may comprise an expression that is equivalent to a Boolean expression that requires each of the parameters of the first database record and that searches the master table for each of the at least one matching subscription.

When executed by the processor, the instructions may further cause the processor to: determine whether to notify the respective subscribers of the update to the database record via at least one from among an e-mail message and a short messaging service (SMS) message; and upon determining that a particular subscriber from among the respective subscribers has elected to be notified in real time, determine that the notification is to be provided to the particular subscriber via the SMS message.

When executed by the processor, the instructions may further cause the processor to compile a list that comprises both the respective subscribers and other relevant entities that are directly impacted by the update to the first database record. The other relevant entities may be determined by at least one from among an artificial intelligence and a machine learning model.

The database that stores the first database record may be managed by a software-as-a-service (SaaS) cloud computing platform.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable storage media having instructions stored thereon for one or more aspects of the present technology as described and illustrated by way of the examples herein. In some examples, the instructions include executable code that, when executed by one or more processors, cause the processors to carry out steps necessary to implement the methods of the examples of this technology that are described and illustrated herein.

Figure 1:
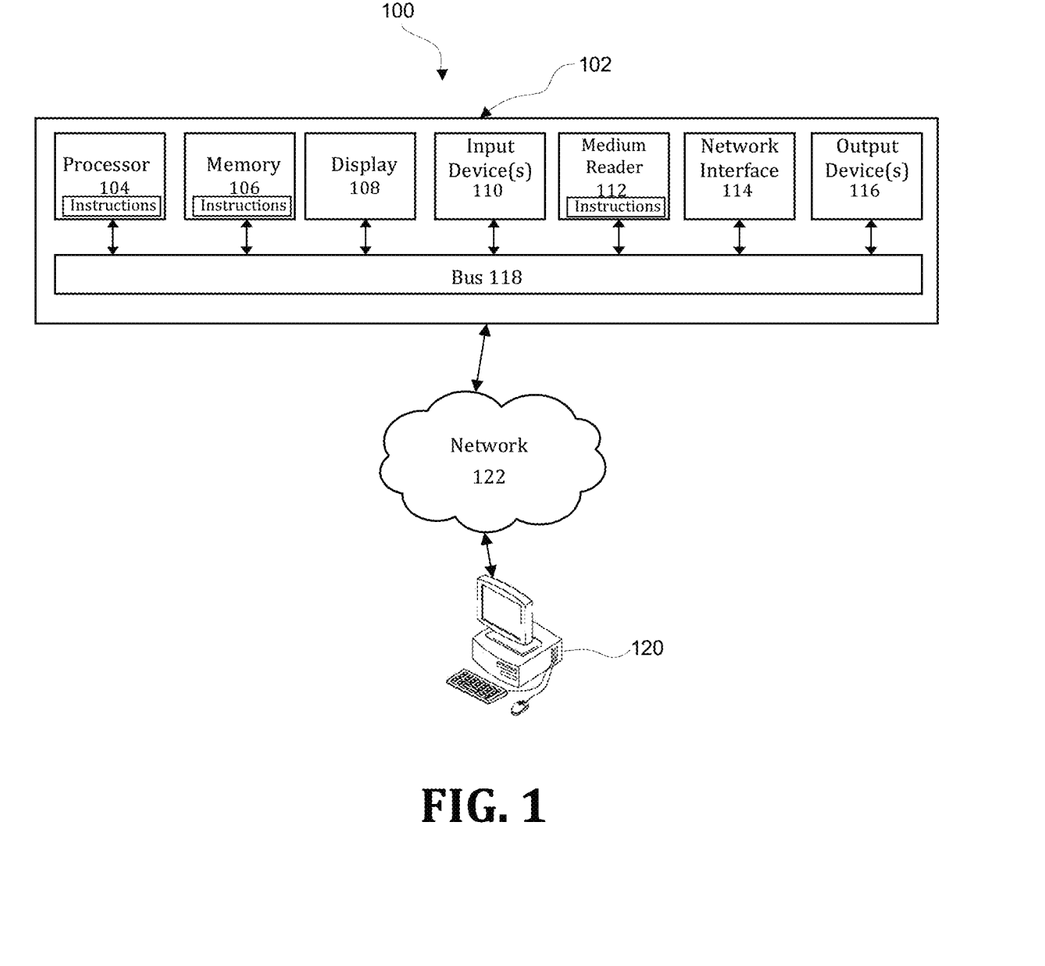
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for utilizing a master table to improve a query efficiency in processing subscriptions upon a creation and update of records in a database.

Figure 2:
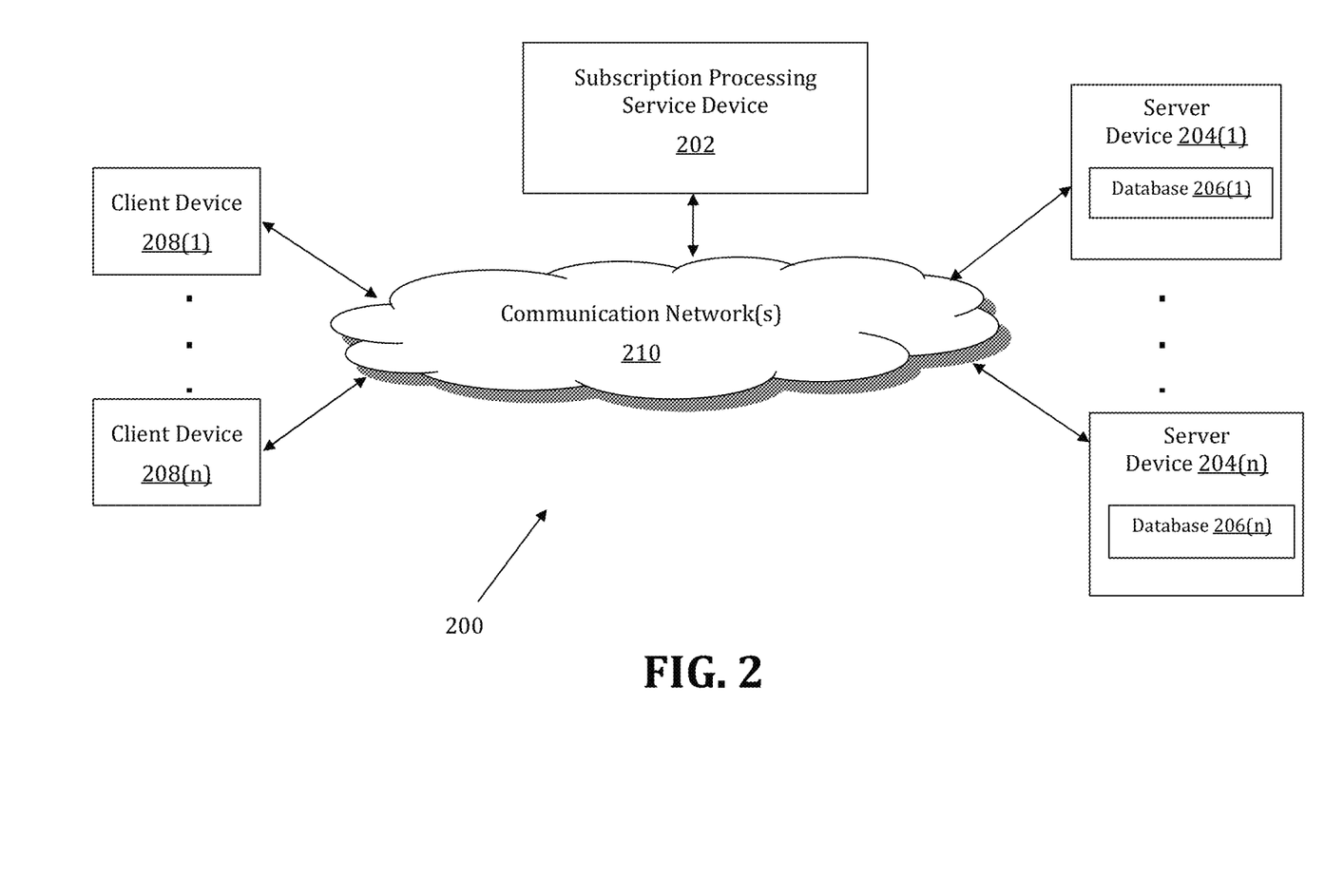
FIG. 2 illustrates an exemplary diagram of a network environment.

Referring to FIG. 2, a schematic of an exemplary network environment 200 for implementing a subscription processing service that improves the overall speed, ease, and user experience of subscription processing tasks, is illustrated. In an exemplary embodiment, the method is executable on any networked computer platform, such as, for example, a personal computer (PC).

The method for utilizing a master table to improve a query efficiency in processing subscriptions upon a creation and update of records in a database may be implemented by a Subscription Processing Service (SPS) device 202. The SPS device 202 may be the same or similar to the computer system 102 as described with respect to FIG. 1. The SPS device 202 may be a rack-mounted server in a datacenter, an embedded microcontroller (MCU) in an electronic device, or another type of headless system, which is a computer system or device that is configured to operate without a monitor, keyboard and mouse. The SPS device 202 may store one or more applications that can include executable instructions that, when executed by the SPS device 202, cause the SPS device 202 to perform actions, such as to transmit, receive, or otherwise process network communications, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SPS device 202 itself, may be located in virtual server(s) running in a cloud-based computing environment rather than being tied to one or more specific physical network computing devices. Also, the application(s) may be running in one or more virtual machines (VMs) executing on the SPS device 202. Additionally, in one or more embodiments of this technology, virtual machine(s) running on the SPS device 202 may be managed or supervised by a hypervisor.

In the network environment 200 of FIG. 2, the SPS device 202 is coupled to a plurality of server devices 204(1)-204(n) that hosts a plurality of databases 206(1)-206(n), and also to a plurality of client devices 208(1)-208(n) via communication network(s) 210. A communication interface of the SPS device 202, such as the network interface 114 of the computer system 102 of FIG. 1, operatively couples and communicates between the SPS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SPS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, computer readable media, and SPS devices that efficiently implement a method for utilizing a master table to improve a query efficiency in processing subscriptions upon a creation and update of records in a database.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SPS device 202 may be a standalone device or integrated with one or more other devices or apparatuses, such as one or more of the server devices 204(1)-204(n), for example. In one particular example, the SPS device 202 may include or be hosted by one of the server devices 204(1)-204(n), and other arrangements are also possible. As another example, the SPS device 202 may be integrated with one or more other devices or apparatuses, such as one or more of the client devices 208(1)-208(n). Moreover, one or more of the devices of the SPS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SPS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relate to database records and a subscription repository.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SPS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SPS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SPS device 202, the server devices 204(1)-204(n), the databases 206(1)-206(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SPS device 202, the server devices 204(1)-204(n), the databases 206(1)-206(n), or the client devices 208(1)-208(n), for example, may be configured to operate as virtual instances on the same physical machine. In other words, one or more of the SPS device 202, the server devices 204(1)-204(n), the databases 206(1)-206(n), or the client devices 208(1)-208(n) may operate on the same physical device rather than as separate devices communicating through communication network(s) 210. Additionally, there may be more or fewer SPS devices 202, server devices 204(1)-204(n), databases 206(1)-206(n), or client devices 208(1)-208(n) than illustrated in FIG. 2.

In addition, two or more computing systems, databases or devices may be substituted for any one of the systems, databases or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
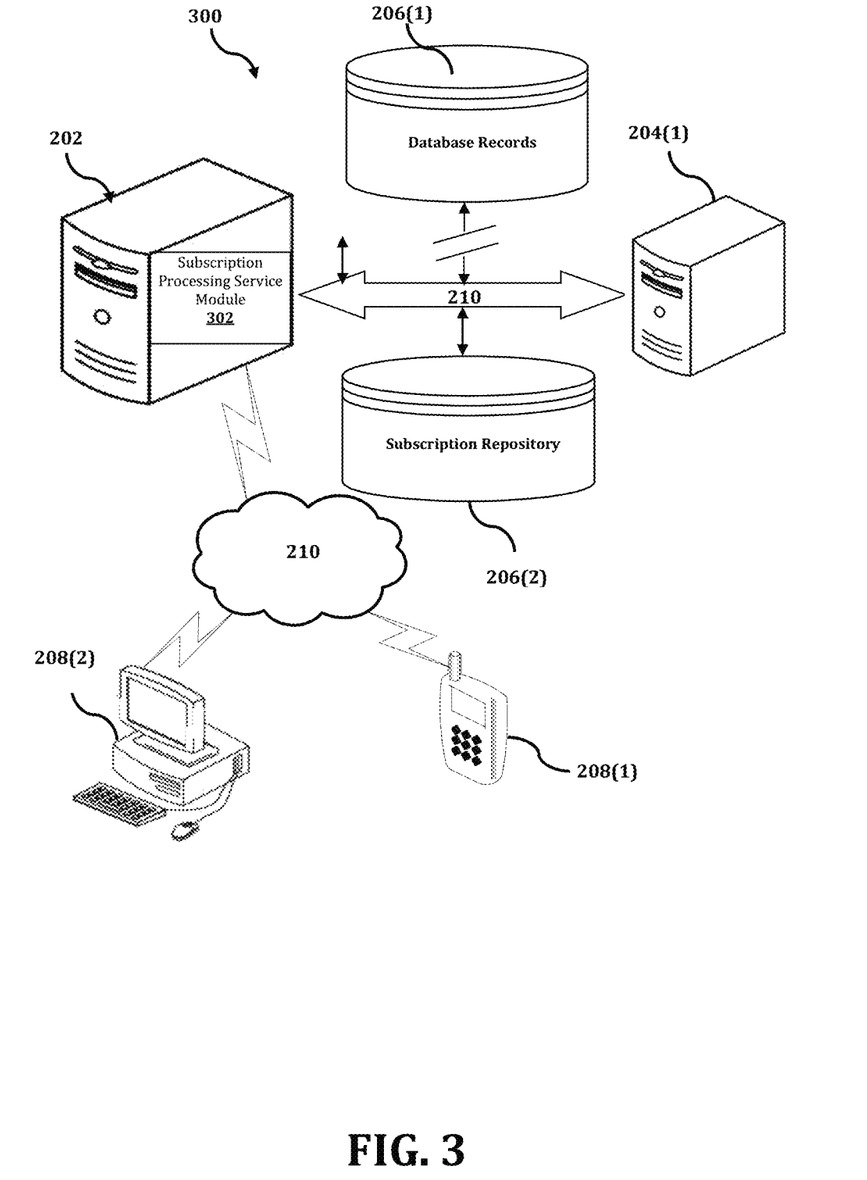
FIG. 3 shows an exemplary system for utilizing a master table to improve a query efficiency in processing subscriptions upon a creation and update of database records in a database.

The SPS device 202 is described and illustrated in FIG. 3 as including subscription processing service module 302, although it may include other rules, policies, modules, databases, or applications, for example. As will be described below, subscription processing service module 302 is configured to implement a method implementing a subscription processing service that improves the overall speed, ease, and user experience of subscription processing tasks. Subscription processing service module 302 may include software that is based on a microservices architecture.

Subscription processing service module 302 may be integrated with one or more devices or apparatuses, such as client devices 208(1)-208(n), where subscription processing service module 302 may be implemented as an application or as an addon or plugin to another application of the one or more devices or apparatuses, and where subscription processing service module 302 may execute in the background.

An exemplary process 300 for implementing a subscription processing service by utilizing the network environment of FIG. 2 is illustrated as being executed in FIG. 3. Specifically, a first client device 208(1) and a second client device 208(2) are illustrated as being in communication with SPS device 202. In this regard, the first client device 208(1) and the second client device 208(2) may be "clients" of the SPS device 202 and are described herein as such. Nevertheless, it is to be known and understood that the first client device 208(1) and/or the second client device 208(2) need not necessarily be "clients" of the SPS device 202, or any entity described in association therewith herein. Any additional or alternative relationship may exist between either or both of the first client device 208(1) and the second client device 208(2) and the SPS device 202, or no relationship may exist.

Further, SPS device 202 is illustrated as being able to access database records 206(1), and subscription repository 206(2). SPS device 202 may comprise a subscription processing service that communicates with database records 206(1). In addition, the subscription processing service of SPS device 202 may also communicate with subscription repository 206(2). The subscription processing service module 302 may be configured to access these databases for utilizing a master table to improve a query efficiency in processing subscriptions upon a creation and update of records in a database. Subscription repository 206(2) may include a subscription table, a mapping table, and the master table. However, the subscription table, the mapping table, and the master table may also, or alternatively, be stored locally in a memory on SPS device 202 itself.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The client devices 208(1)-208(n) may represent, for example, computer systems of an organization or database network. The first client device 208(1) represent, for example, one or more computer systems of a department or cluster within the organization or database network. Of course, the first client device 208(1) may include one or more of any of the devices described herein. The second client device 208(2) may be, for example, one or more computer systems of another department or cluster within the organization or database network. Of course, the second client device 208(2) may include one or more of any of the devices described herein.

The process may be executed via the communication network(s) 210, which may comprise plural networks as described above. For example, in an exemplary embodiment, either or both of the first client device 208(1) and the second client device 208(2) may communicate with the SPS device 202 via broadband or cellular communication. Of course, these embodiments are merely exemplary and are not limiting or exhaustive.

Subscription processing service module 302 may execute a process for utilizing a master table to improve a query efficiency in processing subscriptions upon a creation and update of records in a database. An exemplary process for utilizing a master table to improve a query efficiency in processing subscriptions upon a creation and update of database records in a database, is generally indicated at flowchart 400 in FIG. 4.

Figure 4:
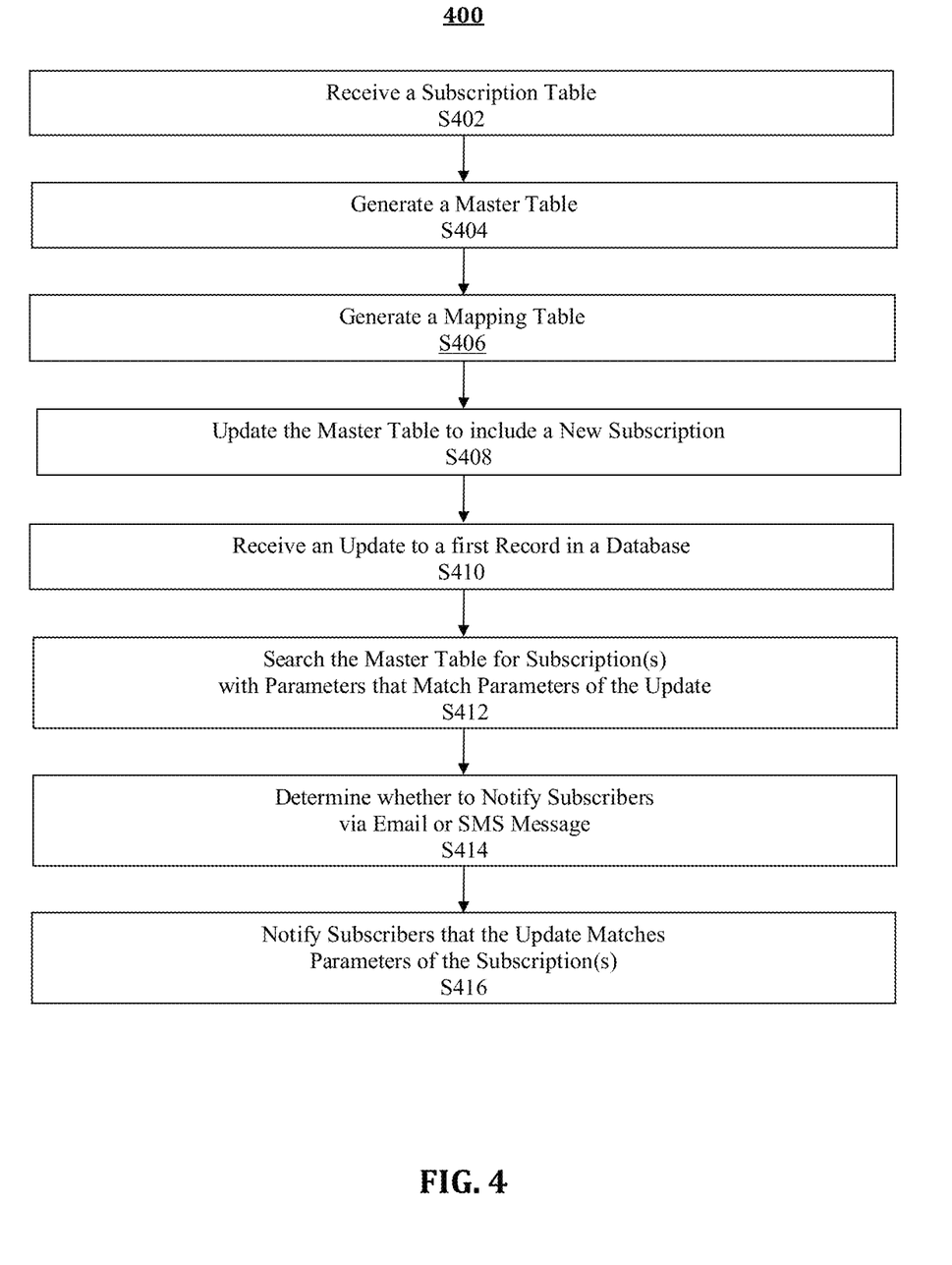
FIG. 4 is a flowchart of an exemplary process for utilizing a master table to improve a query efficiency in processing subscriptions upon a creation and update of database records in a database.

In process 400 of FIG. 4, at step S402, subscription processing service module 302 receives a subscription table. The subscription table may be provided manually by one or more individuals, retrieved from memory, received from a communication network (such as, the Internet or network 122/210), obtained from a source of real-time data, and/or generated by any other input source. A user may use a device such as client device 208(1) or client device 208(2) to provide the input for the subscription table, and the input for the subscription table may be gathered through data mining. The subscription table includes at least one record of at least one subscription. When at least one condition of the at least one subscription is satisfied, the at least one subscription provides at least one subscriber to the at least one subscription, with a notification of the at least one condition.

At step S404, the subscription processing service module 302 utilizes the subscription table to generate a master table. Subscription processing service module 302 may generate the master table by utilizing the subscription table as training data for an artificial intelligence and machine learning (AI/ML) model's decision-making algorithms. Accordingly, the ML model's decision-making may be improved and adjusted by the received input and any subsequent updates to the input or training data. The ML model's decision-making algorithms may be based on one or more various artificial intelligence techniques, such as deep learning, neural networks, or both. In addition, the AI/ML model may utilize a regression and classification AI/ML model for the prediction of recipients and the medium on which to contact them, respectively. The master table may consolidate each of the at least one record and the master table may store, as a string value, each of the at least one condition.

The master table may comprise a plurality of rows and columns that each comprise either string type data or an empty field. Each condition of a subscription in the subscription table may correspond to a distinct column of the master table. However, each condition of the subscription may also, or alternatively, correspond to a distinct row of the master table as well. In addition, each parameter of each condition of the subscription may be stored in the master table as a string value.

At step S406, subscription processing service module 302 generates a mapping table. The mapping table may map fields of the subscription table to fields of the master table. Although process 400 depicts step S404 as occurring prior to step S406, it should be noted that step S406 may actually be performed prior to step S404. However, it should be understood that both steps S404 and S406 may occur automatically and without the need for any user intervention.

Subscription processing service module 302 may receive an indication of an update to the subscription table. The update to the subscription table may include a creation of a new subscription. However, the update to the subscription table may also include a change to an existing subscription. In response to the update, at step S408, subscription processing service module 302 utilizes the mapping table to incorporate the update to the subscription table into the master table. The update to the subscription table includes at least one condition, which may each include at least one parameter. However, when a condition of the update to the subscription table does not include the at least one parameter, then there will be no preference for that condition. Therefore, a condition that has no preference is satisfied by any parameter and, thus, will always be met.

When the update to the subscription table includes the creation of a new subscription, at step S408, subscription processing service module 302 may utilize the mapping table to incorporate the new subscription into the master table. However, when the update to the subscription table includes the change to an existing subscription, at step S408, subscription processing service module 302 may utilize the mapping table to incorporate the change to the existing subscription into the master table. Subscription processing service module 302 utilizes the mapping table to incorporate the update to the subscription table, into the master table by mapping each of at least one parameter of the update to at least one of the fields of the master table.

When the update to the subscription table includes a particular condition that has no parameter then, at step S408, the mapping table will map the particular condition to an empty field of the master table. The empty field of the master table indicates that there is no preference for the particular condition and that the particular condition will be satisfied by any parameter and, thus, will always be met.

When the update to the subscription table includes a specific condition that has alternative parameters, then the master table is populated with separate subscription records that each correspond to each of the alternative parameters of the specific condition. Each of the separate subscription records includes a corresponding condition for each of the at least one condition of the update to the subscription table. Each of the at least one condition of the update to the subscription table may be represented as a distinct column of the master table. However, alternatively, the each of the at least one condition of the update to the subscription table may be represented as a distinct row of the master table.

At step S410, subscription processing service module 302 receives an update to a first database record that is located in a database. The database that stores the first database record may be managed by a software-as-a-service (SaaS) cloud computing platform. The SaaS cloud computing platform may be a proprietary platform that is not publicly available or a commercial platform that is available to the public such as the ServiceNow cloud-based workflow automation platform. The update to the first database record may be a creation of a new database record. However, the update to the first database record may be a change to an existing database record that is located in the database. In response to the update to the first database record, subscription processing service module 302 generates a first query. The first query includes parameters of the first database record. The first query may comprise an expression that is equivalent to a Boolean expression that requires each of the parameters of the first database record.

At step S412, subscription processing service module 302 utilizes the first query to search the master table for at least one subscription that includes parameters that match the parameters of the update to the first database record. It should be noted that, when a particular parameter has not been specified for a corresponding condition of a subscription, then an unspecified parameter of the corresponding condition is always deemed to match a corresponding parameter that is specified for the corresponding condition in the first database record.

When parameters of at least one subscription record in the master table matches parameters of the update to the first database record, subscription processing service module 302 may compile a list of subscribers. The list of subscribers is a list of entities that will be notified that parameters of the update to the first database record meets certain conditions (e.g., when conditions meet the parameters of the at least one subscription record). The list of subscribers may include at least one subscriber to the at least one subscription record. However, the list of subscribers may include at least one entity that is not an explicit subscriber to the at least one subscription record.

The at least one entity that is not an explicit subscriber to the at least one subscription record, may be at least one other relevant entity that is determined by at least one from among an artificial intelligence and a machine learning model. The at least one from among an artificial intelligence and a machine learning model, may determine the at least one other relevant entity based on past activity of the other relevant entity. More particularly, when past activity of the other relevant entity indicates that the update to the first database record may be relevant to that entity, the at least one from among an artificial intelligence and a machine learning model may determine that the other relevant entity will be included in the list of subscribers.

At step S414, subscription processing service module 302 determines whether to notify entities included in the list of subscribers via an e-mail or SMS message. Subscription processing service module 302 may utilize the contact information of each entity to determine whether to notify each entity via an e-mail or SMS message.

For example, when an entity's contact information includes an e-mail address but does not include a mobile telephone number, subscription processing service module 302 may determine to notify that entity of the update via an e-mail message. Conversely, when an entity's contact information includes a mobile telephone number but does not include an e-mail address, subscription processing service module 302 may determine to notify that entity of the update via an SMS message. However, when an entity's contact information includes both an e-mail address and a mobile telephone number, and that entity has elected to be notified in real time, then subscription processing service module 302 may notify that entity of the update via an SMS message. Although process 400 is depicted as notifying subscribers via at least one from among an e-mail message and an SMS message, it should be noted that a subscriber may be notified via any communication medium that is available. For example, a subscriber may be notified via a popup message, an instant message, a direct message, a fax message, a postal message, etc.

At step S416, subscription processing service module 302 notifies entities included in the list of subscribers, via at least one from among an e-mail message or an SMS message, that the update matches certain conditions (e.g., parameters of the at least one subscription).

Accordingly, with this technology, a process for utilizing a master table to improve a query efficiency in processing subscriptions upon a creation and update of records in a database, is provided.

Figure 5:
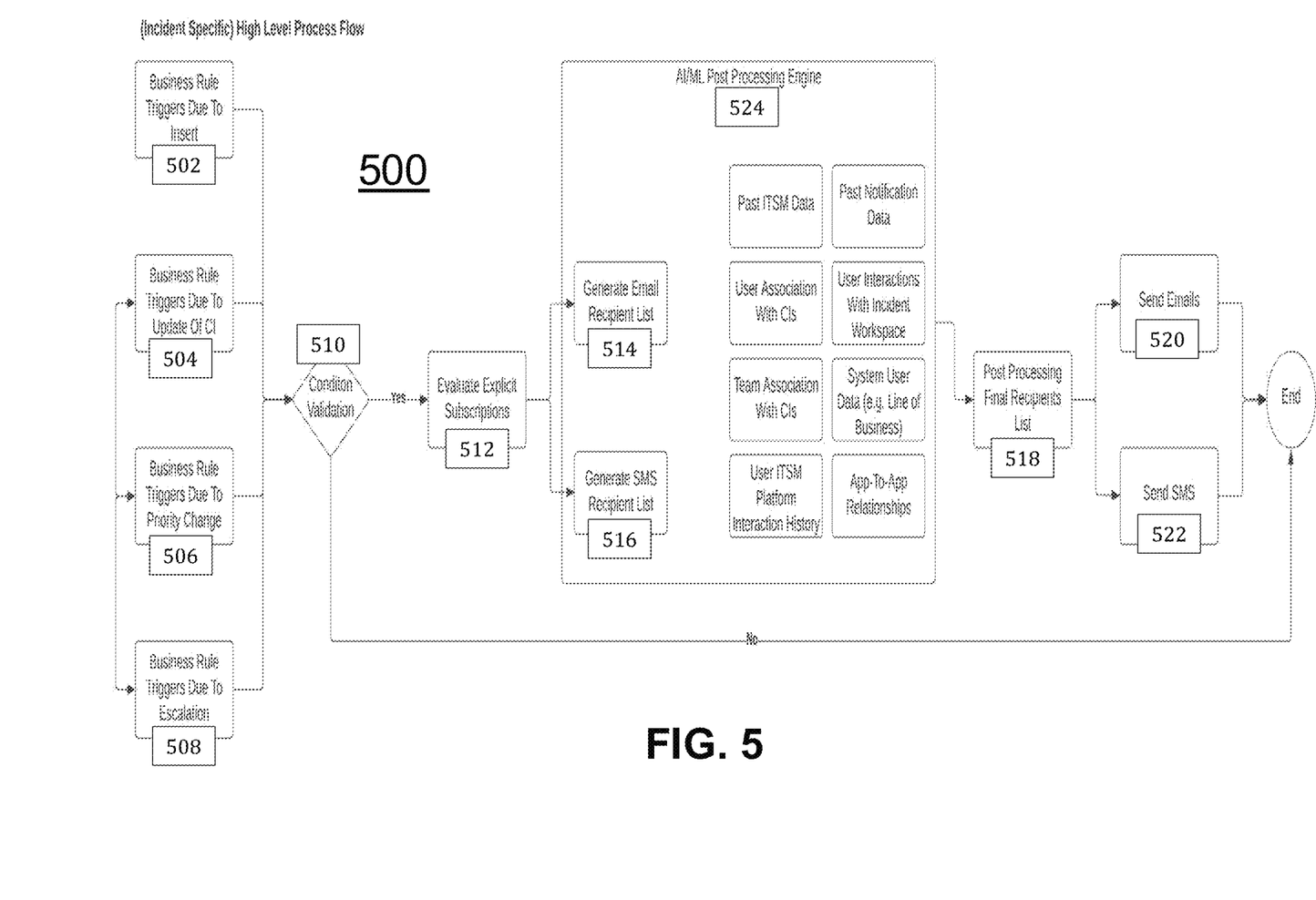
FIG. 5 is an exemplary flowchart for processing subscriptions upon a creation and update of database records in a database.

An exemplary flowchart for processing subscriptions upon a creation and update of database records in a database, is generally indicated at an exemplary process 500 in FIG. 5.

At 502-508 of process 500, a business rule is triggered by an update to a database. The update to the database may include inserting an item into the database, which will trigger a business rule at 502. The update to the database may include an update of a configuration item (CI) or any other item in the database, which will trigger a business rule at 504. A CI is a representation of a physical or virtual asset (in the form of property, software, physical resources, etc.) that may be saved as a record in a configuration management database (CMDB). The update to the database may include a priority change to an item in the database, which will trigger a business rule at 506. Finally, the update to the database may include an escalation of an item in the database, which will trigger a business rule at 508.

Once a business rule is triggered in at least one of 502-508, then process 500 flows to the decision at 510. Decision 510 validates the condition that triggered the business rule in at least one of 502-508, to determines whether it is a valid condition. When decision 510 determines that the condition that triggered the business rule in at least one of 502-508, is not a valid condition, then process 500 will end. However, when decision 510 determines that a valid condition triggered the business rule in at least one of 502-508, then process 500 flows to 512.

At 512, a subscription processing service (e.g., subscription processing service module 302) evaluates a master table to locate any subscriptions that has parameters that match the parameters of the condition that triggered the business rule. The subscription processing service may utilize a query to evaluate the master table and locate subscriptions with parameters that match the parameters of the condition that triggered the business rule. To do this, the subscription processing service may generate a query that queries the dataset of the master subscription table, which is actually a denormalized master subscription table. Thereby, the query may search the master table for any subscription that has parameters that match the parameters of the condition that triggered the business rule.

As a result of 512, a recipient list is compiled and the subscription processing service determines whether to notify entities included in the recipient list via an e-mail or SMS message. The determination of whether to notify entities included in the recipient list via an e-mail or SMS message, may be made by an artificial intelligence and machine learning model (AI/ML) post processing engine of a subscription processing service, such as AI/ML post processing engine 524, which is depicted in FIG. 5. The recipient list may include subscribers to any subscription that has parameters that match the parameters of the condition that triggered the business rule.

Although process 500 is depicted as notifying recipients via at least one from among an e-mail message and an SMS message, it should be noted that a subscriber may be notified via any communication medium that is available. For example, a subscriber may be notified via a popup message, an instant message, a direct message, a fax message, a postal message, etc.

When the subscription processing service determines to notify a first recipient in the recipient list via an e-mail message, at 514, the subscription processing service adds the first recipient to an e-mail recipient list.

When the subscription processing service determines to notify s second recipient in the recipient list via an SMS message, at 516, the subscription processing service adds the second recipient to an SMS recipient list.

Although the recipient list may include subscribers to subscriptions that match parameters of the condition that triggered the business rule, the recipient list may alternatively or additionally include at least one entity that has not explicitly subscribed to a subscription that matches the condition that triggered the business rule.

More particularly, AI/ML post processing engine 524 of FIG. 5 may determine that the condition that triggered the business rule is relevant to at least one entity that has not subscribed to a subscription that matches parameters of the condition that triggered the business rule. This determination may be based on past activity of the at least one relevant entity. For example, when past activity of a relevant entity indicates that the condition that triggered the business rule may be relevant to that entity, then AI/ML post processing engine 524 may determine to include the relevant entity in the recipient list.

At 518, the subscription processing service may utilize disparate information to determine whether to include at least one relevant entity in the recipient list. For example, AI/ML post processing engine 524 of a subscription processing service (e.g., subscription processing service module 302) may utilize at least one from among: information technology service management (ITSM) data; past notification data; user interactions with incident workspaces data; user associations to CIs data; team associations to CIs data; system user data (e.g., line of business); user ITSM platform interaction history data; and application-to-application relationships. At 518, when this information indicates that the condition that triggered the business rule may be relevant to an entity, AI/ML post processing engine 524 of the subscription processing service will add the relevant entity to the recipient list.

After 518, once a final recipient list is compiled, the subscription processing service notifies the recipients in the final recipient list via an e-mail or SMS message. However, although process 500 is depicted as notifying recipients via at least one from among an e-mail message and an SMS message, it should be noted that a recipient may be notified via any communication medium that is available. For example, a recipient may be notified via a popup message, an instant message, a direct message, a fax message, a postal message, etc. Also, once the final recipient list is compiled, but prior to notifying the recipients, the final recipient list may be subjected to post processing operations including, but not limited to, validation and de-duplication. Furthermore, the subscription processing service may leave an audit trail of all of its processing to utilize to update the AI/ML model.

When the subscription processing service determines to notify recipients in the recipient list via an e-mail message, at 520, the subscription processing service notifies these recipients of the condition that triggered the business rule, via an e-mail message.

When the subscription processing service determines to notify recipients in the recipient list via an SMS message, at 522, the subscription processing service notifies these recipients of the condition that triggered the business rule, via an SMS message.

Accordingly, with this technology, a process for utilizing a master table to improve a query efficiency in processing subscriptions upon a creation and update of database records in a database, is provided by process 500.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for utilizing a master table, the method comprising:
   receiving a subscription table that includes at least one subscription record of at least one subscription that, upon satisfaction of at least one condition of the at least one subscription, provides, to a subscriber, a notification of the at least one condition;
   generating the master table, wherein the master table consolidates each of the at least one subscription record and stores, as a string value, each parameter of each of the at least one condition;
   generating a mapping table that maps fields of the subscription table to fields of the master table;
   receiving an indication of an update to a first database record in a database;
   generating a first query for parameters of the first database record;
   utilizing the first query to search the master table for at least one matching subscription that has subscription parameters that each match at least one of the parameters of the first database record; and
   for each of the at least one matching subscription, notifying, respective subscribers to each of the at least one matching subscription, of the update to the first database record,
   wherein, upon determining that a particular parameter has not been specified for a corresponding condition of the matching subscription, an unspecified parameter of the corresponding condition is always deemed to match a corresponding parameter that is specified for the corresponding condition in the first database record, and
   wherein the database that stores the first database record is managed by a software-as-a-service (SaaS) cloud computing platform.

2. The method of claim 1, wherein:
   an update to the subscription table automatically initiates a corresponding update to the master table and the mapping table; and
   the corresponding update comprises the update.

3. The method of claim 1, further comprising:
   receiving an indication of an update to the subscription table, wherein the update includes a new subscription record that relates to a new subscription; and
   updating the master table to include the new subscription record by utilizing the mapping table to map, to at least one of the fields of the master table, each of at least one new parameter that corresponds to the new subscription,
   wherein, when a particular condition of at least one new condition that corresponds to the new subscription does not specify one of the at least one new parameter, the updating comprises utilizing the mapping table to map the particular condition to an empty field of the master table,
   wherein, for each alternative parameter that is specified as being one of alternative parameters of a first new condition of the at least one new condition, the master table is populated with separate subscription records that each correspond to each of the one of alternative parameters of the first new condition, and
   wherein each of the separate subscription records includes a corresponding condition for each of the at least one new condition that corresponds to the new subscription.

4. The method of claim 1, wherein the each of the at least one condition is represented, in the master table, as one from among a distinct column and a distinct row.

5. The method of claim 1, wherein the first query comprises an expression that is equivalent to a Boolean expression that requires each of the parameters of the first database record and that searches the master table for each of the at least one matching subscription record.

6. The method of claim 1, further comprising:
determining whether to notify the respective subscribers of the update to the first database record via at least one from among an email message and a short messaging service (SMS) message; and
upon determining that a particular subscriber from among the respective subscribers has elected to be notified in real time, determining that the notification is to be provided to the particular subscriber via the SMS message.

7. The method of claim 1, further comprising compiling a list that comprises both the respective subscribers and other relevant entities that are directly impacted by the update to the first database record, wherein the other relevant entities are determined by at least one from among an artificial intelligence and a machine learning model.

8. A system for utilizing a master table, the system comprising:
a processor; and
a memory that stores instructions that, when executed by the processor, cause the processor to:
receive a subscription table that includes at least one subscription record of at least one subscription that, upon satisfaction of at least one condition of the at least one subscription, provides, to a subscriber, a notification of the at least one condition;
generate the master table, wherein the master table consolidates each of the at least one subscription record and stores, as a string value, each parameter of each of the at least one condition;
generate a mapping table that maps fields of the subscription table to fields of the master table;
receive an indication of an update to a first database record in a database;
generate a first query for parameters of the first database record;
utilize the first query to search the master table for at least one matching subscription that has subscription parameters that each match at least one of the parameters of the first database record; and
for each of the at least one matching subscription, notify, respective subscribers to each of the at least one matching subscription, of the update to the first database record,
wherein, upon determining that a particular parameter has not been specified for a corresponding condition of the matching subscription, an unspecified parameter of the corresponding condition is always deemed to match a corresponding parameter that is specified for the corresponding condition in the first database record, and
wherein the database that stores the first database record is managed by a software-as-a-service (SaaS) cloud computing platform.

9. The system of claim 8, wherein:
an update to the subscription table automatically initiates a corresponding update to the master table and the mapping table; and
the corresponding update comprises the update.

10. The system of claim 8, wherein the instructions, when executed by the processor, further cause the processor to:
receive an indication of an update to the subscription table, wherein the update includes a new subscription record that relates to a new subscription; and
update the master table to include the new subscription record by utilizing the mapping table to map, to at least one of the fields of the master table, each of at least one new parameter that corresponds to the new subscription,
wherein, when a particular condition of at least one new condition that corresponds to the new subscription does not specify one of the at least one new parameter, the updating comprises utilizing the mapping table to map the particular condition to an empty field of the master table, wherein, for each alternative parameter that is specified as being one of alternative parameters of a first new condition of the at least one new condition, the master table is populated with separate subscription records that each correspond to each of the one of alternative parameters of the first new condition, and
wherein each of the separate subscription records includes a corresponding condition for each of the at least one new condition that corresponds to the new subscription.

11. The system of claim 8, wherein the first query comprises an expression that is equivalent to a Boolean expression that requires each of the parameters of the first database record and that searches the master table for each of the at least one matching subscription record.

12. The system of claim 8, wherein the instructions, when executed by the processor, further cause the processor to:
determine whether to notify the respective subscribers of the update to the first database record via at least one from among an email message and a short messaging service (SMS) message; and
upon determining that a particular subscriber from among the respective subscribers has elected to be notified in real time, determine that the notification is to be provided to the particular subscriber via the SMS message.

13. The system of claim 8, wherein the instructions, when executed by the processor, further cause the processor to:
compile a list that comprises both the respective subscribers and other relevant entities that are directly impacted by the update to the first database record, wherein the other relevant entities are determined by at least one from among an artificial intelligence and a machine learning model.

14. A non-transitory computer-readable medium storing instructions for utilizing a master table, wherein the instructions, when executed by a processor, cause the processor to:
receive a subscription table that includes at least one subscription record of at least one subscription that, upon satisfaction of at least one condition of the at least one subscription, provides, to a subscriber, a notification of the at least one condition;
generate the master table, wherein the master table consolidates each of the at least one subscription record and stores, as a string value, each parameter of each of the at least one condition;
generate a mapping table that maps fields of the subscription table to fields of the master table;
receive an indication of an update to a first database record in a database;
generate a first query for parameters of the first database record;
utilize the first query to search the master table for at least one matching subscription that has subscription parameters that each match at least one of the parameters of the first database record; and for each of the at least one matching subscription, notify, respective subscribers to each of the at least one matching subscription, of the update to the first database record, wherein, upon determining that a particular parameter has not been specified for a corresponding condition of the matching subscription, an unspecified parameter of the corresponding condition is always deemed to match a corresponding parameter that is specified for the corresponding condition in the first database record, and wherein the database that stores the first database record is managed by a software-as-a-service (SaaS) cloud computing platform.

15. The non-transitory computer-readable medium of claim 14, wherein the instructions, when executed by the processor, further cause the processor to:
   an update to the subscription table automatically initiates a corresponding update to the master table and the mapping table; and
   the corresponding update comprises the update.

16. The non-transitory computer-readable medium of claim 14, wherein the each of the at least one condition is represented, in the master table, as one from among a distinct column and a distinct row.

17. The non-transitory computer-readable medium of claim 14, wherein the instructions, when executed by the processor, further cause the processor to:
   receive an indication of an update to the subscription table, wherein the update includes a new subscription record that relates to a new subscription; and
   update the master table to include the new subscription record by utilizing the mapping table to map, to at least one of the fields of the master table, each of at least one new parameter that corresponds to the new subscription,
   wherein, when a particular condition of at least one new condition that corresponds to the new subscription does not specify one of the at least one new parameter, the updating comprises utilizing the mapping table to map the particular condition to an empty field of the master table,
   wherein, for each alternative parameter that is specified as being one of alternative parameters of a first new condition of the at least one new condition, the master table is populated with separate subscription records that each correspond to each of the one of alternative parameters of the first new condition, and
   wherein each of the separate subscription records includes a corresponding condition for each of the at least one new condition that corresponds to the new subscription.

18. The non-transitory computer-readable medium of claim 14, wherein the instructions, when executed by the processor, further cause the processor to:
   receive an indication of an update to the subscription table, wherein the update includes a new subscription record that relates to a new subscription; and
   update the master table to include the new subscription record by utilizing the mapping table to map, to at least one of the fields of the master table, each of at least one new parameter that corresponds to the new subscription,
   wherein, when a particular condition of at least one new condition that corresponds to the new subscription does not specify one of the at least one new parameter, the updating comprises utilizing the mapping table to map the particular condition to an empty field of the master table,
   wherein, for each alternative parameter that is specified as being one of alternative parameters of a first new condition of the at least one new condition, the master table is populated with separate subscription records that each correspond to each of the one of alternative parameters of the first new condition, and
   wherein each of the separate subscription records includes a corresponding condition for each of the at least one new condition that corresponds to the new subscription.

19. The non-transitory computer-readable medium of claim 14, wherein the first query comprises an expression that is equivalent to a Boolean expression that requires each of the parameters of the first database record and that searches the master table for each of the at least one matching subscription record.

20. The non-transitory computer-readable medium of claim 14, wherein the instructions, when executed by the processor, further cause the processor to:
   utilize the subscription table as training data for an artificial intelligence and a machine learning model (AI/ML) model that:
      utilizes a regression AI/ML model to predict at least one from among the respective subscribers; and
      utilizes a classification AI/ML model determine a medium on which to contact the at least one from among the respective subscribers.

\* \* \* \* \*